(12) United States Patent
Bonds (10) Patent No.: US 11,229,190 B2
(45) Date of Patent: Jan. 25, 2022

(54) TWO HANDED DOG LEASH

(71) Applicant: Stephen Joshua Bonds, Suisun, CA (US)

(72) Inventor: Stephen Joshua Bonds, Suisun, CA (US)

( * ) Notice: Subject to any disclaimer, the term of this patent is extended or adjusted under 35 U.S.C. 154(b) by 344 days.

(21) Appl. No.: 16/520,329

(22) Filed: Jul. 23, 2019

(65) Prior Publication Data

US 2019/0387715 A1     Dec. 26, 2019

(51) Int. Cl.
*A01K 27/00* (2006.01)

(52) U.S. Cl.
CPC .......... *A01K 27/003* (2013.01); *A01K 27/008* (2013.01)

(58) Field of Classification Search
CPC .. A01K 27/003; A01K 27/004; A01K 27/008; A01K 27/005
See application file for complete search history.

(56) References Cited

U.S. PATENT DOCUMENTS

| 7,926,452 | B1 * | 4/2011 | Kim | A01K 27/004 119/796 |
| 8,104,145 | B1 * | 1/2012 | Hajianpour | B25G 1/08 16/428 |
| 2015/0208613 | A1 * | 7/2015 | Krasilczuk | A01K 27/003 119/792 |
| 2017/0217546 | A1 * | 8/2017 | Yates | F16G 11/106 |

FOREIGN PATENT DOCUMENTS

| DE | 202015003650 U1 * | 7/2015 | .......... A01K 27/003 |
| SE | 1630178 A1 * | 1/2018 | .......... A01K 27/003 |

\* cited by examiner

*Primary Examiner* — Blake A Tankersley (57) ABSTRACT

A two-handed dog leash with a rigid tubular member, a cleat assembly, a flexible dog leash, and a leash termination member. The tubular member has a hollow portion on one end and a slot portion on the opposite end. The cleat assembly is mounted on either side of a central aperture in the tube. The dog leash is inserted into the central tube aperture and is capable of extending perpendicular to the rigid handle member so that a person can hold the handle with two hands or can extend parallel to the rigid handle member and reside in the slot portion of the handle member so that a person can use the handle with one hand.

7 Claims, 16 Drawing Sheets

TWO HANDED DOG LEASH

CROSS-REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of dog leashes and more specifically to a two-handed dog leash.

Many people walk their pet dogs on leashes. This is necessary in urban and suburban areas where an unleashed dog may cause harm to another dog or person or may run away from its owner.

Most dog leashes are made of flexible woven material that is either rope-like or is a flat configuration. One end terminates in a wrist or hand strap, the other end terminates in an attachment fixture that attaches the leash to a dog collar.

However, there is a deficiency in the prior technology in that a person sometimes has trouble holding onto a larger dog when it decides to bolt after something. With a normal leash, the user only has the use of one hand to restrain the dog. Additionally, by pulling on one hand, the user's body is forced into an unbalanced position which can cause the person to either lose control of the leash or to fall to the ground.

BRIEF SUMMARY OF THE INVENTION

The primary object of the invention is to provide a dog leash that allows a person to use two hands when using a leash while walking or restraining a dog.

Another object of the invention is to provide a two-handed dog leash that allows the user to adjust the length of the leash.

Another object of the invention is to provide a dog leash that can also be used with one hand when so desired.

A further object of the invention is to provide a dog leash that includes a storage area for bags or treats.

Yet another object of the invention is to provide a dog leash that allows the user to roll up the leash on its rigid bar-shaped handle for storage or transport.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed two-handed dog leash comprising: a rigid tubular member, a tube cover member, a cleat assembly, a flexible dog leash, and a leash termination member, said rigid tubular member having a hollow portion on one end and a slot portion on the opposite end and a centrally located aperture, said cleat assembly mounted on either side of said tube aperture, said cover member mounted over said cleat assembly, said dog leash member inserted at one end into said central tube aperture, said dog leash terminating on the opposite in said leash termination member, and said dog leash capable of extending perpendicular to said rigid handle member for two-handed operation or extending parallel to said rigid handle member and residing in said slot portion of said handle member for one-handed operation.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
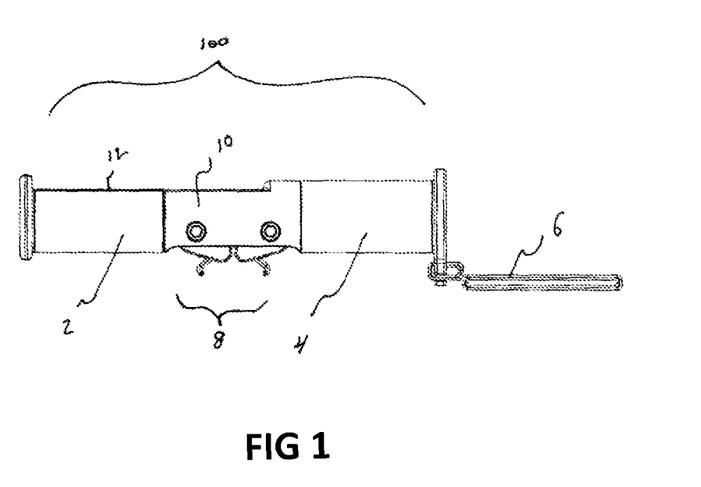
FIG. 1 is a side view of the invention.

Referring now to FIG. 1 we see a side view of the invention 100. A rigid tubular member is made up of a left side 2 a central portion 10 and a right side 4. The right side 4 is an open-ended tube that includes a slide-out drawer for holding items such as bags or dog treats. The left side 2 includes a slot, as will be shown in additional Figures. The left 2 and right 4 sides are sized to be a proper grip for an adult user's hands. A wrist strap 6 is attached to the end of the right end 4. Spring biased cleat assembly 8 allows the user to adjust the length of the leash, as will be shown in future Figures.

Figure 2:
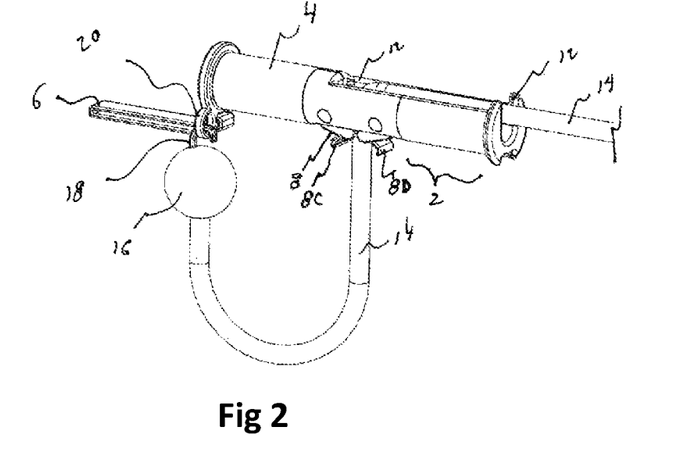
FIG. 2 is a perspective view of the invention with leash residing in slot.

FIG. 2 is a perspective view of the invention showing a dog leash 14 terminating at one end in a termination member 16 which is spherical in shape but may also be other shapes. The termination member 16 includes a hook member 18 that can attach to a loop member 20 located at the end of tube portion 4. The leash 14 in this embodiment is made of rope having a circular cross-section. The rope passes through an aperture which is centrally located in the tubular handle 2, 4. The leash can bend ninety degrees to reside in slot 12 and exit the slot 12 to connect to a dog collar. This embodiment allows the user to hold the tube 4 with one hand when so desired. Cleat assembly 8 allows the leash 14 length to be adjusted by sliding the leash down to reduce the length of the usable portion of the leash, or to increase the length of the leash by pulling tabs 8C and 8D away from each other thereby freeing the leash 14 to be slid forward.

Figure 3:
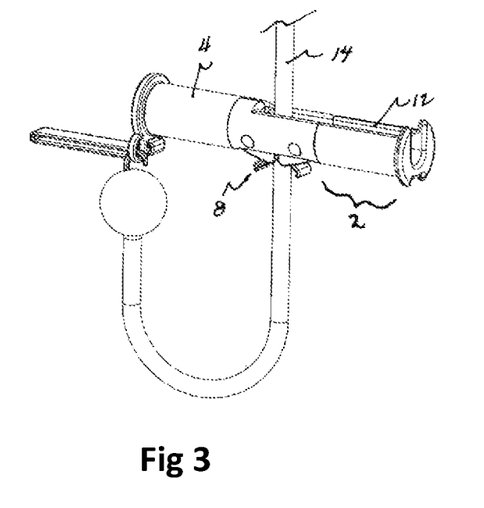
FIG. 3 is a perspective view of the invention with the leash exiting straight out of the tube aperture.

FIG. 3 is a perspective view that is similar to the view in FIG. 2 except that the leash 14 is extending straight out from the tube 2, 4 so that the leash 14 is perpendicular to the tube 2, 4. This allows the user to hold the tube 2, 4 with two hands when needing to restrain a large dog. The two-handed method of restraint increases the user's ability to control a dog that may be bolting after another dog or person. It also decreases the chance of injury to the user because the user is in a more stable position to restrain the dog when facing the dog directly and having both feet planted firmly on the ground while both hands grip the handles 2, 4.

Figure 4:
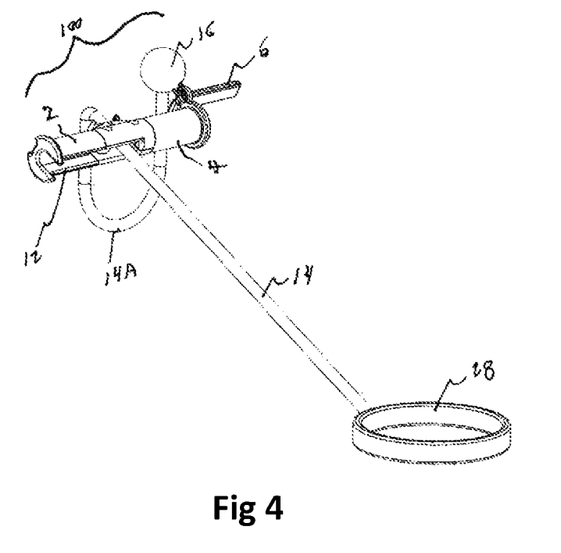
FIG. 4 is a perspective view of the leash being perpendicular to the handle.

FIG. 4 is a perspective view showing the invention used in the two-handed orientation. Leash 14 attaches to dog collar 28 in the standard way which involves a spring biased coupling, shown in FIG. 6. Leash termination member 16 insures that if the leash 14 is pulled to its maximum usable length, it will not fully escape the tubular handle 2, 4 because it is much larger than the aperture that the leash passes through.

Excess leash 14A is prevented from dragging on the ground because termination member 16 is hooked to the end of tube portion 4.

Figure 5:
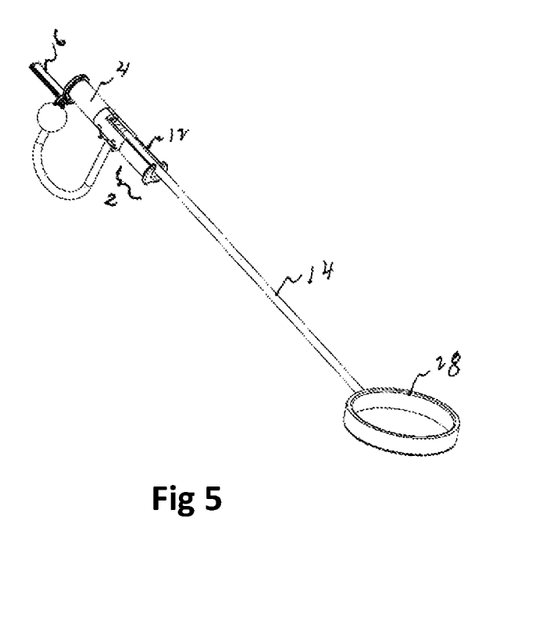
FIG. 5 is a perspective view of the leash being parallel to the handle.

FIG. 5 is a perspective view showing the invention being used in the one-handed orientation. Leash 14 is inserted into slot 12 and is extending straight out from tube portion 2. The user may prefer this one-handed operation when the dog is not expected to bolt. However, wrist strap 6 provides additional insurance that even if the dog bolts, the user will not lose total control of the handle 4.

Figure 6:
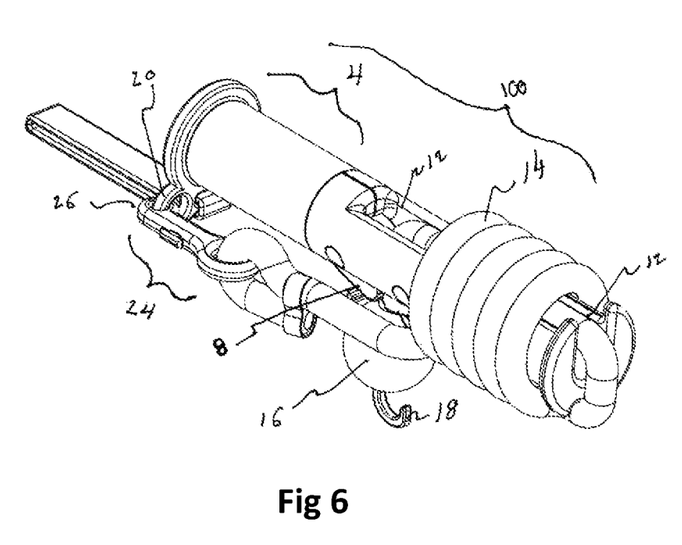
FIG. 6 is a perspective view of a rope type leash being rolled up on the handle for storage.

FIG. 6 is a perspective view of the invention 100 showing the leash 14 rolled up on the tubular structure 4, 2. The end of the leash terminates in a standard spring biased fastening clip 24 which is attached to a dog collar during use, but which is now attached to retaining ring 20 during storage mode. Terminating member 16 has been drawn up to be touching the cleat assembly 8.

Figure 7:
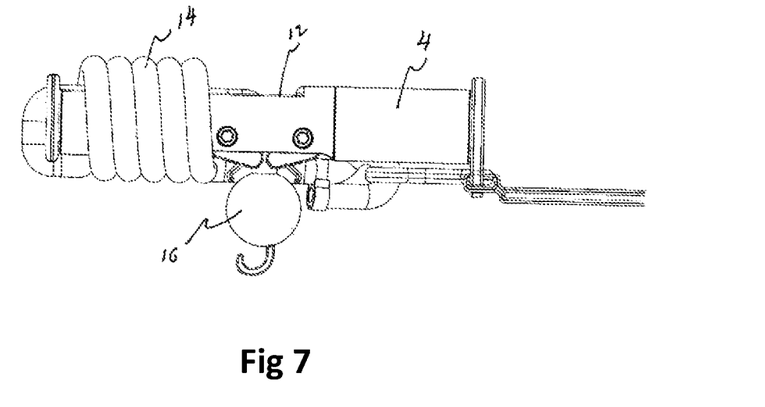
FIG. 7 is a side view of the rope type leash being rolled up on the handle.

FIG. 7 is a side view of the leash 14 in the storage position.

Figure 8:
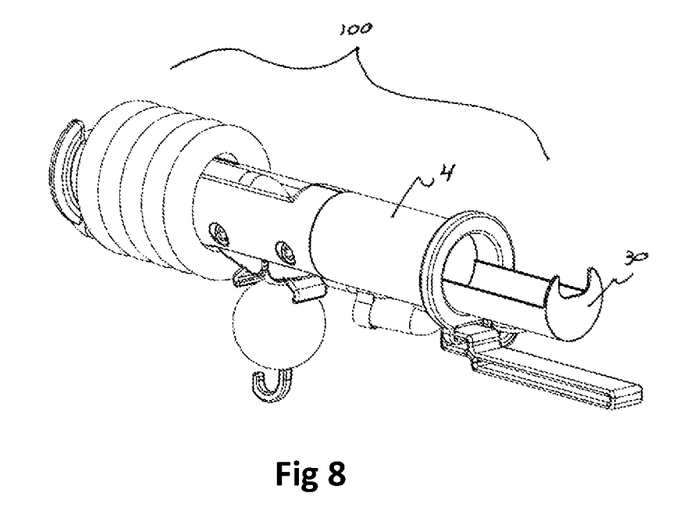
FIG. 8 is a perspective view of the storage compartment.

FIG. 8 is a perspective view showing the end of tubular portion 4 with the drawer 30 shown slid out and ready to accept a bag, or dog treat or other small item.

Figure 9:
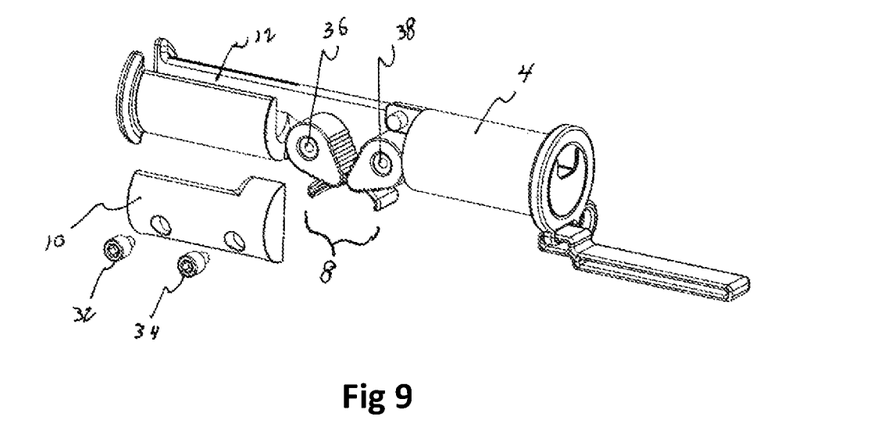
FIG. 9 is an exploded view showing the tube cover removed.

FIG. 9 is an exploded view showing the cleat cover 10 removed to fully expose the cleat assembly 8. The two-cleat fingers are spring biased to be rotated inward toward each other and pivot on posts 36, 38. The posts 36, 38 are recessed so that screws 32, 34 can be screwed into the recessed area that remains after the screw heads 36, 38 have been fully secured, thereby holding cover plate 10 in place.

Figure 10:
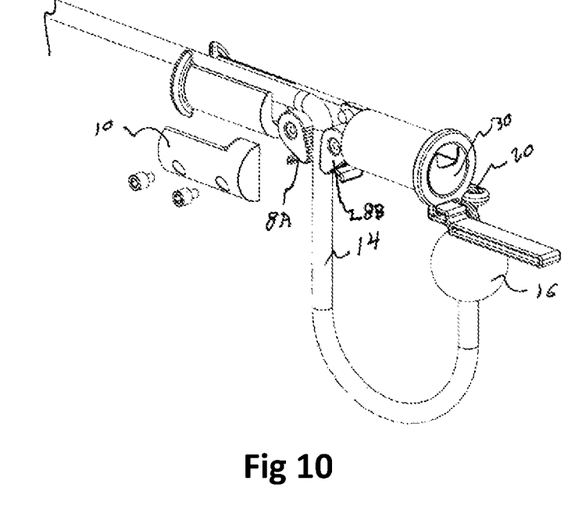
FIG. 10 is an exploded view with the tube cover removed and the rope type leash in place

FIG. 10 is a perspective view similar to that of FIG. 9 but with leash 14 in place. Cleat fingers 8A, 8B have been spread to accommodate the diameter of the leash rope 14.

The teeth on each cleat finger 8A, 8B prevent the rope from being pulled up. The cleat assembly 8 is rated for approximately three hundred pounds of pull force.

Figure 11:
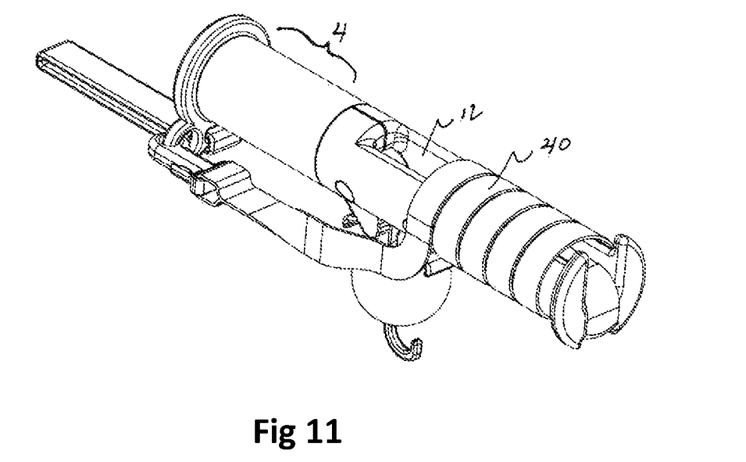
FIG. 11 is a perspective view of a flat leash rolled up onto the tubular handle.

FIG. 11 is a perspective view of the invention with a flat type leash 40 rather than a round rope type leash 14. The cleat assembly 8 works equally as well with a flat leash 40 or a rope type leash 14.

Figure 12:
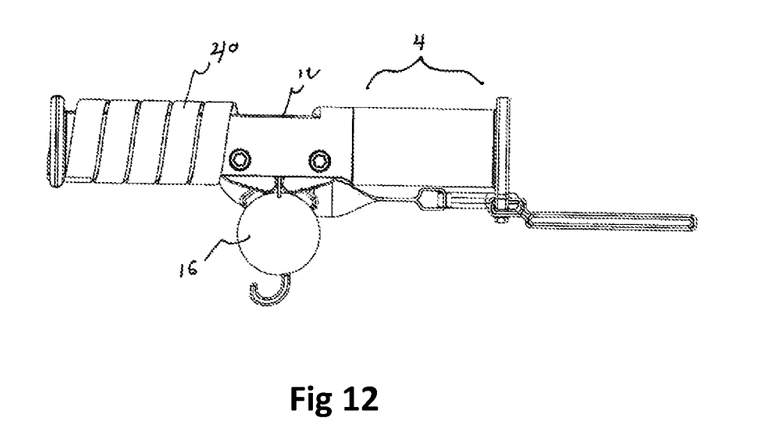
FIG. 12 is a side view of the flat leash rolled up onto the tubular handle.

FIG. 12 is a side view of the invention with a flat type leash 40 wrapped into the storage position.

Figure 13:
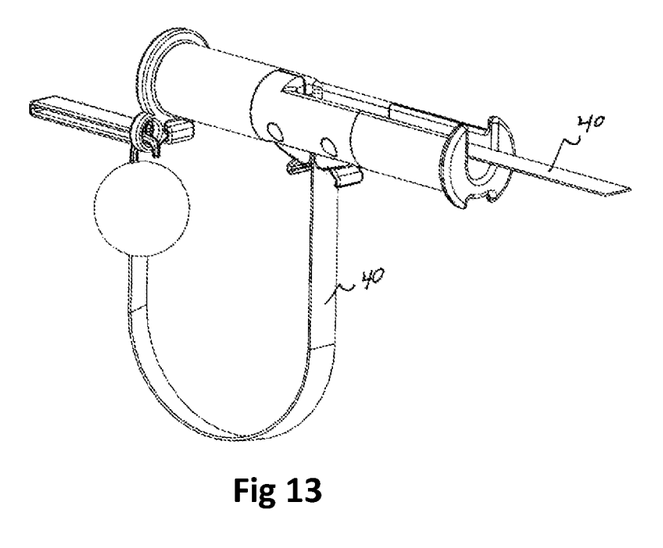
FIG. 13 is a perspective view of the flat leash being used in the one-handed condition.

FIG. 13 is a perspective view of the invention 100 with the flat leash 40 in the one-handed orientation.

Figure 14:
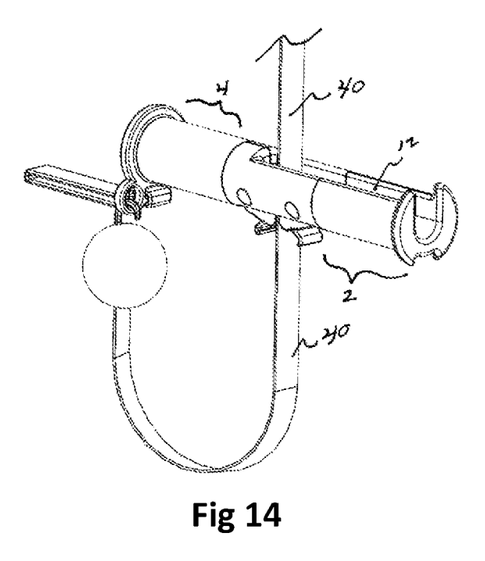
FIG. 14 is a perspective view of the flat leash being used in the two-handed condition.

FIG. 14 is a perspective view of the invention 100 with the flat leash 40 in the two-handed orientation.

Figure 15:
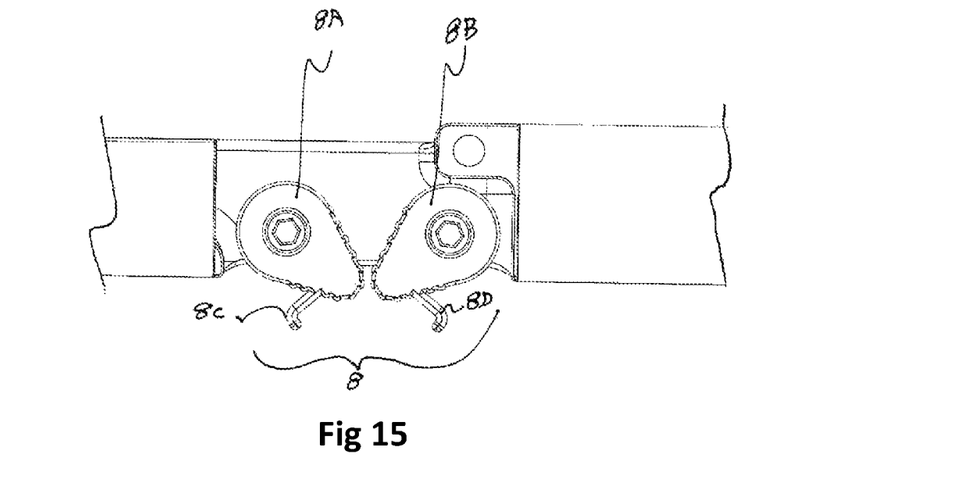
FIG. 15 is a close-up view of the cleat assembly in the closed position.

FIG. 15 is a close-up view of the cleat assembly 8 clearly showing cleat fingers 8A and 8B as well as spreading tabs 8C and 8D.

Figure 16:
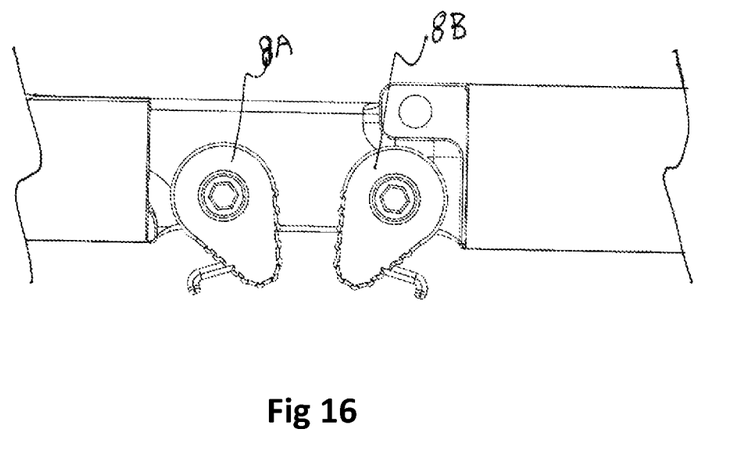
FIG. 16 is a close-up view of the cleat assembly in the open position.

FIG. 16 is the same as FIG. 15 except that the cleat fingers 8A and 8B are spread and ready to accept rope leash 14.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A two-handed dog leash comprising:
   a rigid tubular member;
   a tube cover member;
   a cleat assembly;
   a flexible dog leash;
   a dog leash end member;
   a leash termination member;
   said rigid tubular member having a hollow portion on one end and a slot portion on an opposite end and a centrally located aperture;
   said cleat assembly mounted on either side of said centrally located aperture;
   said tube cover member mounted over said cleat assembly;
   said dog leash inserted at one end into said centrally located aperture;
   said dog leash terminating at said leash termination member; and
   said dog leash capable of extending perpendicular to said rigid tubular member or extending parallel to said rigid tubular member and residing in said slot portion of said rigid tubular member.

2. The two-handed dog leash as claimed in claim 1 wherein the hollow portion of said tubular member includes a slide out drawer that can be used to store flexible bags or dog treats.

3. The two-handed dog leash as claimed in claim 1 wherein said leash termination member is a rigid sphere.

4. The two-handed dog leash as claimed in claim 1 wherein said cleat assembly includes a pair of spring biased inwardly facing rigid fingers;
   said fingers being rotatably pinned to said rigid tubular member;
   said fingers each including a release tab for pulling said fingers apart to release said dog leash.

5. The two-handed dog leash as claimed in claim 1 wherein said dog leash is constructed of rope having a circular cross-section.

6. The two-handed dog leash as claimed in claim 1 wherein said dog leash is constructed of woven material forming a flat rectangular cross-section.

7. The two-handed dog leash as claimed in claim 1 further comprising a wrist strap attached to said hollow portion of said rigid tubular member.

\* \* \* \* \*